United States Patent
Chatterjee et al.

(10) Patent No.: US 10,304,049 B2
(45) Date of Patent: May 28, 2019

(54) COMPUTING DISTANCES OF DEVICES

(71) Applicant: Square, Inc., San Francisco, CA (US)

(72) Inventors: Shuvo Chatterjee, San Francisco, CA (US); Michael Thole, San Francisco, CA (US)

(73) Assignee: Square, Inc., San Francisco, CA (US)

( * ) Notice: Subject to any disclaimer, the term of this patent is extended or adjusted under 35 U.S.C. 154(b) by 901 days.

(21) Appl. No.: 14/310,802

(22) Filed: Jun. 20, 2014

(65) Prior Publication Data

US 2015/0371210 A1    Dec. 24, 2015

(51) Int. Cl.
| | |
|---|---|
| *G06Q 20/32* | (2012.01) |
| *H04W 4/02* | (2018.01) |
| *G06Q 20/20* | (2012.01) |
| *G06Q 30/06* | (2012.01) |
| *H04M 1/725* | (2006.01) |

(52) U.S. Cl.
CPC .......... *G06Q 20/327* (2013.01); *G06Q 20/20* (2013.01); *G06Q 20/202* (2013.01); *G06Q 20/209* (2013.01); *G06Q 20/3224* (2013.01); *G06Q 20/3278* (2013.01); *G06Q 30/06* (2013.01); *H04W 4/023* (2013.01); *H04M 1/72569* (2013.01); *H04M 1/72572* (2013.01)

(58) Field of Classification Search
CPC .. G06Q 30/06; G06Q 20/327; G06Q 20/3224; G06Q 20/202; G06Q 20/20; G06Q 20/3278; G06Q 20/209; H04W 4/023
USPC .......................................................... 705/21
See application file for complete search history.

(56) References Cited

U.S. PATENT DOCUMENTS

| | | | |
|---|---|---|---|
| 6,674,403 B2 | 1/2004 | Gray et al. | |
| 6,952,181 B2 | 10/2005 | Karr et al. | |
| (Continued) | | | |

FOREIGN PATENT DOCUMENTS

| | | | |
|---|---|---|---|
| CA | 2 953 125 A1 | 12/2015 | |
| EP | 2 731 363 A1 | 5/2014 | |
| (Continued) | | | |

OTHER PUBLICATIONS

Zhou, Junyi. Analysis of localization error and its effect on geographic routing in wireless networks. North Dakota State University, ProQuest Dissertations Publishing, 2010.*

(Continued)

*Primary Examiner* — Nathan C Uber
*Assistant Examiner* — Fawaad Haider
(74) *Attorney, Agent, or Firm* — Lee & Hayes, P.C.

(57) ABSTRACT

Methods, systems, and apparatus, including computer programs encoded on a computer storage medium, for computing distance between devices. In one aspect, a method includes the actions of determining an approximate distance between a merchant computer and a customer device based on a strength of a wireless signal associated with data transmitted and received between the merchant device and customer device. The actions further include validating the approximate distance based on signals from a plurality of motion sensors of the customer device to generate a validated distance. The actions further include generating a list with the one or more customers ranked in the list based on the validated distance. The actions further include presenting, on the merchant device, the list of the one or more customers.

20 Claims, 6 Drawing Sheets

(56) References Cited

U.S. PATENT DOCUMENTS

| | | | |
|---|---|---|---|
| 8,484,151 | B1 | 7/2013 | Lookingbill |
| 8,744,749 | B2 | 6/2014 | Gupta et al. |
| 9,247,447 | B1 | 1/2016 | Vivanco et al. |
| 9,449,121 | B2 | 9/2016 | Marti |
| 9,582,797 | B1 | 2/2017 | Holmes et al. |
| 2004/0203832 | A1 | 10/2004 | An |
| 2005/0233748 | A1 | 10/2005 | Robinson et al. |
| 2006/0022048 | A1 | 2/2006 | Johnson |
| 2007/0042770 | A1 | 2/2007 | Yasui et al. |
| 2008/0214203 | A1 | 9/2008 | Titli et al. |
| 2009/0204449 | A1 | 8/2009 | Waytena et al. |
| 2009/0228325 | A1 | 9/2009 | Simmons et al. |
| 2009/0303204 | A1 | 12/2009 | Nasiri et al. |
| 2010/0015994 | A1 | 1/2010 | Mcbride et al. |
| 2010/0063854 | A1 | 3/2010 | Purvis et al. |
| 2010/0087144 | A1* | 4/2010 | Korenshtein ........ H04B 17/318 455/41.2 |
| 2011/0158187 | A1 | 6/2011 | Komamura et al. |
| 2011/0250901 | A1 | 10/2011 | Grainger et al. |
| 2011/0285591 | A1 | 11/2011 | Wong |
| 2012/0303402 | A1 | 11/2012 | Koury |
| 2013/0006847 | A1* | 1/2013 | Hammad ............... G06Q 20/20 705/39 |
| 2013/0030931 | A1* | 1/2013 | Moshfeghi .............. G01S 19/48 705/16 |
| 2013/0046463 | A1 | 2/2013 | Bengtson et al. |
| 2013/0117695 | A1 | 5/2013 | Hammoud |
| 2013/0229930 | A1 | 9/2013 | Akay et al. |
| 2013/0254104 | A1 | 9/2013 | Fernandez |
| 2013/0332208 | A1 | 12/2013 | Mehta |
| 2014/0030982 | A1 | 1/2014 | Cardona |
| 2014/0074705 | A1 | 3/2014 | Kimberg et al. |
| 2014/0149241 | A1 | 5/2014 | Neuneker et al. |
| 2014/0163934 | A1 | 6/2014 | Zhang et al. |
| 2014/0180960 | A1 | 6/2014 | Sagfors et al. |
| 2014/0368601 | A1 | 12/2014 | deCharms |
| 2015/0038171 | A1 | 2/2015 | Uilecan et al. |
| 2015/0081348 | A1 | 3/2015 | Avera et al. |
| 2015/0186803 | A1 | 7/2015 | Stong |
| 2015/0186957 | A1 | 7/2015 | Barr et al. |
| 2016/0021507 | A1 | 1/2016 | Gaines |
| 2016/0095188 | A1 | 3/2016 | Verberkt et al. |
| 2016/0148121 | A1 | 5/2016 | Durham et al. |
| 2016/0192149 | A1 | 6/2016 | Zises |
| 2017/0169413 | A1 | 6/2017 | Holmes et al. |

FOREIGN PATENT DOCUMENTS

| | | |
|---|---|---|
| JP | 2017-528686 A | 9/2017 |
| WO | 2015/195890 A1 | 12/2015 |

OTHER PUBLICATIONS

International Search Report and Written Opinion, for PCT Application No. PCT/US2015/036392, dated Sep. 17, 2015.
Locke, Phil. *Cell Tower Triangulation—How It Works*. Wrongful Convictions Blog. Published Jun. 1, 2012. Retrieved on Nov. 11, 2014. Retrieved from the internet: URL<http://wrongfulconvictionsblog.org/2012/06/01/cell-tower-triangulation-how-it-works/>. 4 pages.
Vigna, B., "Tri-axial MEMS gyroscopes and Six Degree-Of-Freedom Motion Sensors," MEMS and Sensors Group, Electron Devices Meeting (IEDM), 2011 IEEE International, dated Dec. 5, 2011, pp. 29.1.1-29.1.3.
Extended European Search Report for European Patent Application No. 15808998.7, dated Jun. 2, 2017.
Examination Report No. 1 for Australian Patent Application No. 2015277086, dated Aug. 2, 2017.
Examiner's Requisition for Canadian Patent Application No. 2953125, dated Aug. 31, 2017.
English-language translation of Notification of Reasons for Refusal for Japanese Patent Application No. 2016-573568, dated Feb. 19, 2018.
Bulut, M.F., et al., "LineKing: Crowdsourced Line Wait-Time Estimation using Smartphones," Retrieved from the Internet URL: http://www.cse.buffalo.edu/-demirbas/publications/lineking.pdf, on Oct. 17, 2016, pp. 1-20.
Bullock, D.M., et al., "Automated Measurement of Wait Times at Airport Security," Transportation Research Record: Journal of Transportation Research Board, No. 2177, pp. 60-68 (Dec. 2010).
Ishikawa, T., et al., "Economic and Synergistic Pedestrian Tracking System for Indoor Environments," International conference of Soft Computing and Pattern Recognition, pp. 522-527 (Dec. 4-7, 2009).
Notice of Allowance dated Oct. 17, 2016, for U.S. Appl. No. 14/461,072, of Holmes, J., et al., filed Aug. 15, 2014.
Corrected Notice of Allowance dated Nov. 14, 2016, for U.S. Appl. No. 14/461,072, of Holmes, J., at al., filed Aug. 15, 2014.
Corrected Notice of Allowance dated Nov. 23, 2016, for U.S. Appl. No. 14/461,072, of Holmes, J., at al., filed Aug. 15, 2014.
Examination Report No. 2 for Australian Patent Application No. 2015277086, dated Jul. 13, 2018.
Notice of Acceptance for Australian Patent Application No. 2015277086, dated Jul. 25, 2018.
Examiner Requisition for Canadian Patent Application No. 2,953,125, dated Aug. 7, 2018.
English-language translation of Notification of Reasons for Refusal for Japanese Patent Application No. 2016-573568, dated Sep. 21, 2018.
English-language translation of Decision to Grant for Japanese Patent Application No. 2016-573568, dated Oct. 29, 2018.
Non-Final Office Action dated Mar. 1, 2019, for U.S. Appl. No. 15/441,909, of Holmes, J., et al., filed Feb. 24, 2017.

* cited by examiner

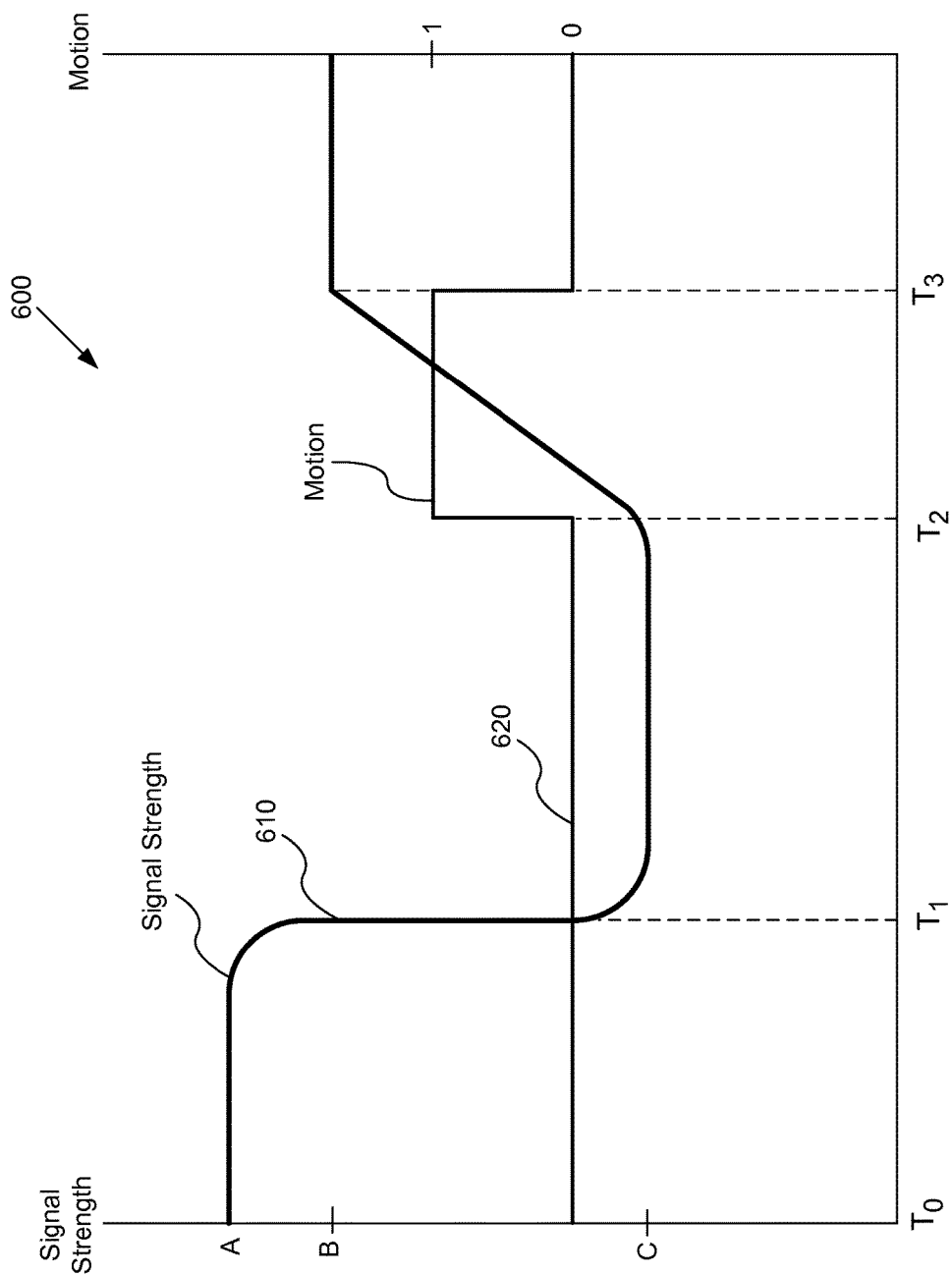

COMPUTING DISTANCES OF DEVICES

BACKGROUND

A measurement of radio signal strength, e.g. a Received Signal Strength Indicator ("RSSI"), can be used to estimate a distance of a device that is emitting the radio signal, e.g. a mobile device. Fixed radio receivers can also be used to triangulate a location of a mobile device. Mobile device locations can also be determined using Global Positioning System (GPS) signals.

BRIEF DESCRIPTION OF THE DRAWINGS

FIG. 6 is a diagram of an example graph of signal strength and motion data.

Like reference numbers and designations in the various drawings indicate like elements.

DETAILED DESCRIPTION

Figure 1:
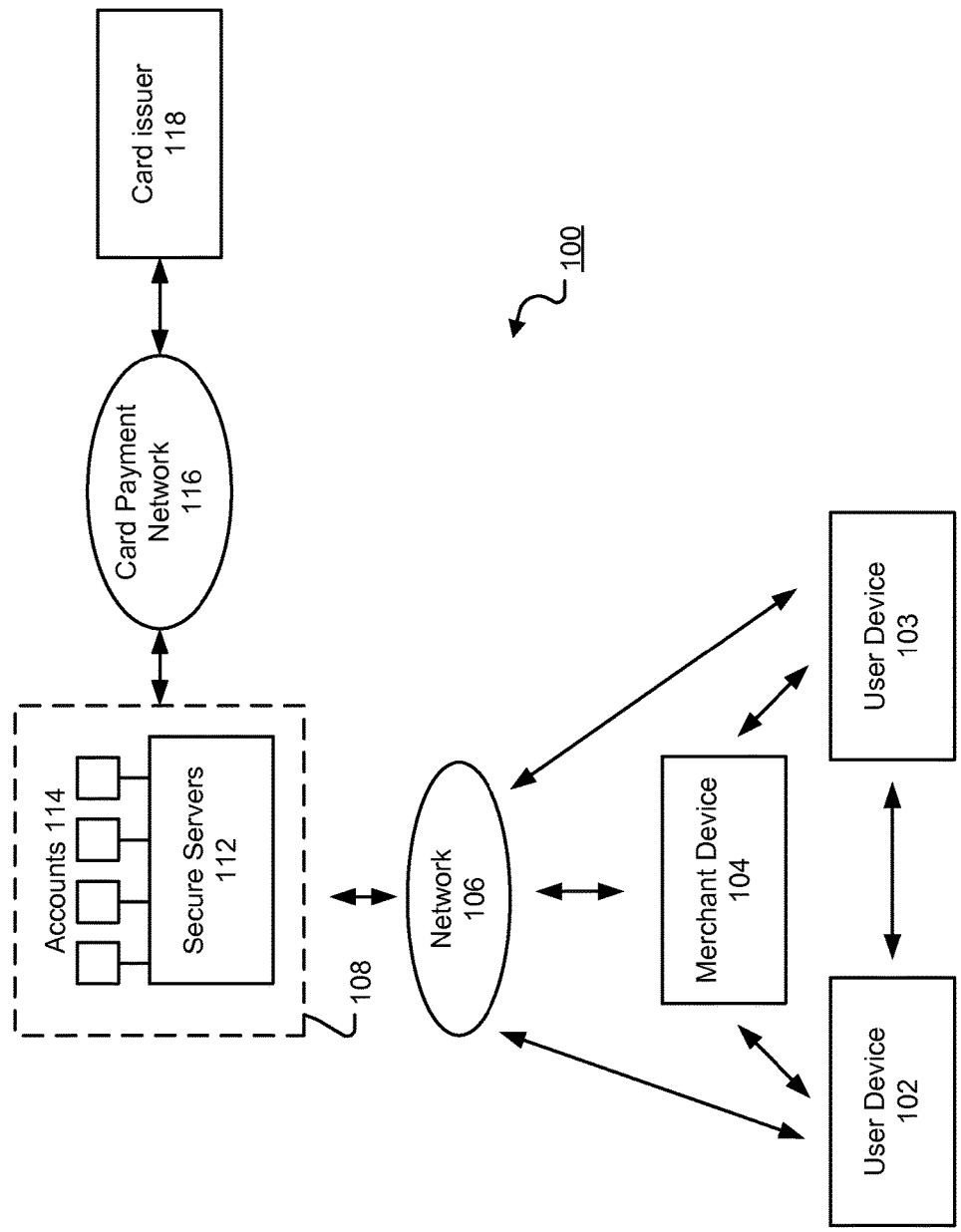
FIG. 1 is a schematic illustration of the architecture of an example system.

A system can use radio signal strength measurements measured by a merchant device and/or radio signal strength measurements measured by mobile devices to compute a distance of each mobile device from a merchant device. The system can then use data from motion processors located in the mobile device to validate or adjust the computed distance. A merchant device can then display customer information arranged by distance from the merchant device to facilitate processing the orders of customers waiting in line.

In this specification, the radio signal strength measurement can include any appropriate indicator of radio signal strength, e.g. decibels, a signal to noise ratio, or RSSI, to name a few examples. The radio signals emitted by the user devices can be part of any appropriate standard for mid to short range radio signal communications, including NFC, Bluetooth, Bluetooth Low Energy, and other technologies with a range of less than one hundred meters. However, the techniques discussed below may work at any range.

The examples below will relate to computing distances between a merchant device and mobile devices that are participating in a cardless payment system. However, the techniques described are not limited to cardless payment systems, to calculating and validating distances from a merchant device, to ranking user devices by calculated and validated distances, or to systems that process payment transactions. Other systems can also compute and validate such distances of mobile devices from a reference computing device using measured radio signal strengths as measured by the mobile devices. In such systems the reference device takes the place of the merchant device. In addition, the techniques described can be implemented by other systems capable of communicating over other wireless communication technologies having similar broadcast ranges.

A payment service system allows a user (also called a customer or payer) to purchase items from a merchant while physically present at the merchant, e.g., at the point of sale, or online, e.g. through a merchant's website. Some payment service systems process cardless payment transactions. A cardless payment transaction is one where a user conducts the transaction with a merchant at a point of sale or online by using a financial account without physically presenting or otherwise providing information about a payment card to the merchant at the point of sale. In fact, the merchant need not receive any details about the financial account, e.g., the credit card issuer, credit card number, and the like is not provided to the merchant.

From the user's perspective, the user first signs up for an account with the payment service system. The sign-up process requires certain information, such as information about a financial account sufficient to perform a transaction with the account. For example, if the financial account is a credit card account, then credit card information can be provided, e.g., credit card number and expiration date. The user can also sign up with other payment methods such as debit cards, pre-paid cards, bank accounts, or other third party financial accounts. The sign up process can also require contact information for the user, e.g., mailing address and email, and other personal identifying information, e.g., a photograph of the user. After creating an account, the user can select a merchant that also has an account with the payment service system.

To conduct cardless payment transactions with a merchant at the point of sale, the user can give consent to perform a cardless payment transaction with the merchant. After the user gives consent, the merchant can, without using a physical payment card, charge (in the case of credit cards) or debit (in the case of debit cards) the user's financial account for items the user wants to buy. Because the user's payment card is already on file with the cardless payment system, the user does not need to physically present a credit card to the merchant.

FIG. 1 is a schematic illustration of the architecture of an example system 100. The overall system 100 includes two user devices 102 and 103, a merchant device 104, and a payment service system 108 connected to a network, e.g., the Internet 106. The user device 102 is a computing device capable of running software applications. For example, the user device 102 can be a desktop computer, laptop computer, smartphone, or tablet computer. The merchant device 104 is also a computing device, capable of processing transactions. The merchant device 104 can be a mobile device, a server, a desktop computer, a laptop computer, a dedicated point-of-sale system, or other data processing apparatus. By using the payment service system 108, the user device 102 and merchant device 104 can conduct a payment transaction, for example a cardless or online payment transaction.

The merchant device 104 can communicate with the payment service system 108 using the network 106. Optionally, the user devices 102, 103 can also communicate with the payment service system 108 using the network 106. In addition, the user devices 102, 103 can communicate directly with the merchant device 104 using a short to mid-range communication technology, e.g. near field communication (NFC), Bluetooth, or Bluetooth Low Energy (BLE) technologies. In some implementations, the user devices 102, 103 can communicate directly with one another using a short to mid-range communication technology.

The payment service system 108 includes one or more servers 112, at least some of which can handle secure transactions (e.g., a secure server), to processes all transactions between the user device 102 and merchant device 104. In general, servers 112 can store public merchant information such as the merchant's address or phone number. The servers 112 can also be responsible for transferring or updating the user application to the user's mobile device or transferring or updating the merchant application to the merchant's computing device. In particular, the servers 112 can be responsible for sending information about merchants that have accounts with the cardless payment system to the user device 102. The servers 112 also handle secure information such as credit card numbers, debit card numbers, bank accounts, user accounts, user identifying information or other sensitive information.

The payment service system 108 can communicate electronically with a card payment network 116, e.g., Visa, Mastercard, or the like. The payment service system 108 can communicate with a computer system 116 of a card payment network, e.g., Visa or MasterCard. The payment service system 108 can communicate with a computer system 116 over the same network 106 used to communicate with the user device 102, or over a different network. The computer system 116 of the card payment network can communicate in turn with a computer system 118 of a card issuer, e.g., a bank. There can also be computer systems of other entities, e.g., the card acquirer, between the payment service system 108 and the card issuer.

Before a transaction between the user and the merchant can be performed, the user must create a user account with the payment service system 108 and the merchant must create a merchant account with the payment service system 108.

The user can sign up using a mobile application or using an online website, and can use the mobile device 102 or another computing device, e.g., a home computer. At some point prior to the transaction, a user application is downloaded to the user device 102, e.g., through an application store. Creation of the user account can be handled through the user application, or through another application, e.g., a generic web browser. The user enters a name, account password, and contact information, e.g., email address. Before a transaction can be performed, the user also enters financial account information sufficient to conduct the transaction into the payment service system 108. For example, in the case of a credit card account, the user can enter the credit card issuer, credit card number and expiration date into the payment service system 108; the card validation value and mailing address may also be required. However, the financial account could also be associated with a debit card or pre-paid card, or another third party financial account.

In some implementations, the payment service system 108 requires additional personal identifying information before a transaction can be performed. For example, the payment service system 108 may require a photo of the user before a transaction can be performed. The photo of the user can be provided to the merchant at the point of sale so that the merchant can compare the photo to the person. In addition, the payment service system 108 can require a personal identification number (PIN) to be entered by the user. Other requirements can also be added to increase security. The data associated with a user account 114 can be stored at the servers 112, e.g., in a database.

If the user is signing up with a mobile application, the user's financial account information can be entered by swiping the financial transaction card through a slot of a card reader coupled to the mobile device. Alternatively, the user can enter in financial account information by typing in information at the mobile device 102, selecting a card from an application on the mobile device, from an online entity, or others. In some implementations, another external application generates a receipt that is sent to the user. The receipt then includes a hypertext link that allows a user to easily create a user account in the cardless payment system. For example, activating the link in the receipt can automatically create a user account with a payment card prefilled with the card used in the receipt to reduce effort by the user. In effect, activating a new account using a receipt auto-verifies the user into the cardless payment system.

The merchant can sign up for an account using the merchant device 104 or another device. The merchant enters a name, account password, and contact information, e.g., email address, and physical location information, e.g., an address, into the payment service system 108. The merchant can also provide other information, e.g., a list of goods or services available, operating hours, phone number, a small identifying image logo or mark, to the payment service system 108. The data associated with the merchant account 114 can be stored at the servers 112, e.g., in a database.

At some point prior to the transaction, a merchant application is downloaded to the merchant device 102, e.g., through an application store. Creation of the merchant account can be handled through the merchant application, or through another application, e.g., a generic web browser.

Eventually, in order to receive funds from the transaction, the merchant will need to enter financial account information into the payment service system sufficient to receive funds. For example, in the case of a bank account, the user can enter the bank account number and routing number. However, the merchant's financial account can also be associated with a credit card account or another third party financial account. In addition, in some implementations, if the merchant has not entered the financial account information, the cardless payment processor can hold the received funds until the financial account information is provided.

Figure 2:
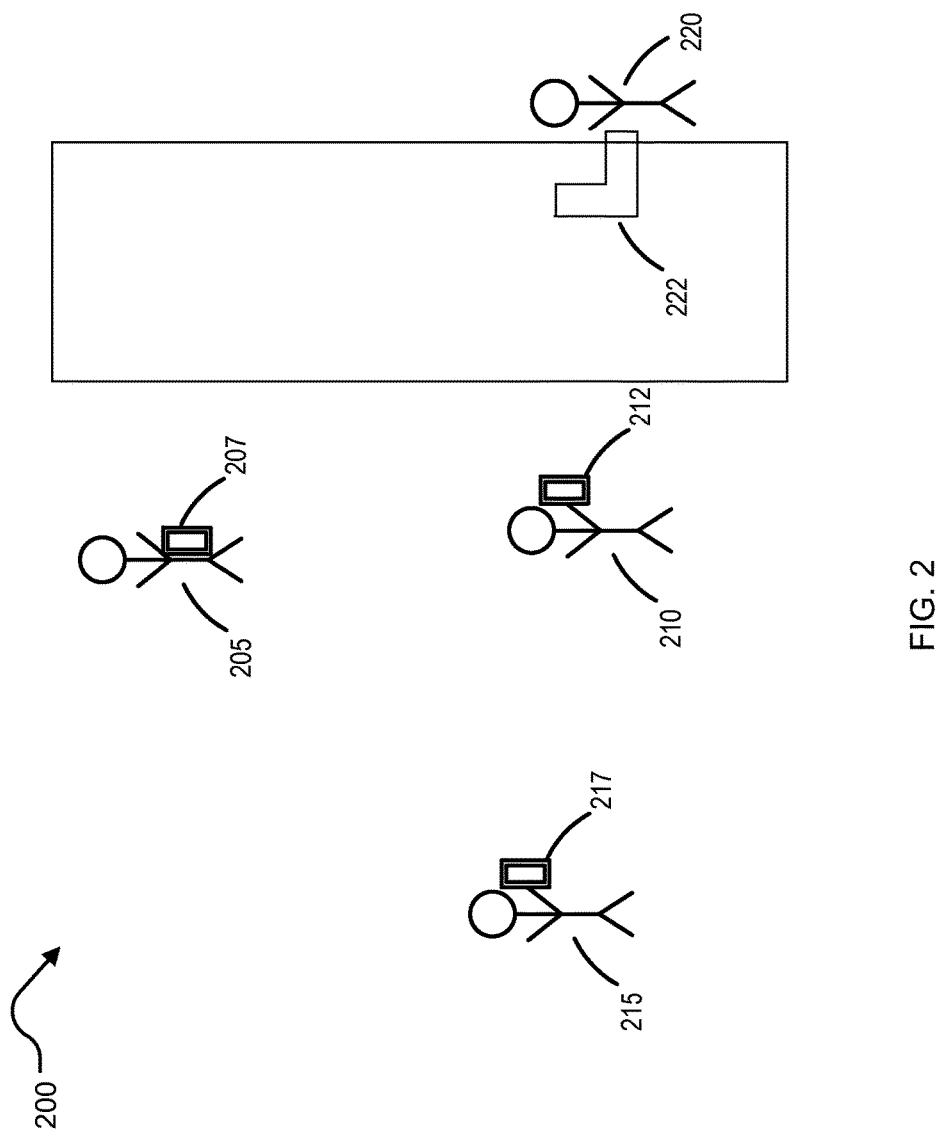
FIG. 2 is a diagram that illustrates customers, each with a customer device, at a merchant's place of business.

FIG. 2 is a diagram 200 that illustrates customers, each with a customer device, at a merchant's place of business. Customers 205, 210, and 215 may be waiting to pay, sitting at a bar, waiting in line, browsing the merchant's store, or sitting at a table. Each customer is carrying a customer device 207, 212, or 217, and each customer can provide payment to the merchant 220 through a cardless payment system, such as the cardless payment system 100 from FIG. 1. User devices 102 and 103 from FIG. 1 can be examples of customer devices 207, 212, and 217.

The merchant device 222, which is an example of merchant device 104 from FIG. 1, can measure the radio signal strength emitted from each customer device 207, 212, and 217. For example, the merchant device 222 can measure the radio signal strength being emitted by customer device 207. The radio signal emitted from a customer device will generally include a unique identifier that can be used to distinguish a particular customer device from other customer devices. The unique identifier will generally not include personally identifying information about the user, and may be updated on a frequent and rotating basis to mitigate the risk of spoofing or fraud.

In some implementations, the merchant device 222 may emit a radio signal. A customer device, for example, customer device 207, may measure the strength of the radio signal emitted from the merchant device. The radio signal may include an identifier that allows the customer device 207 to identify that merchant device 222 is emitting the radio signal. The customer device 207 may use the radio signal for a local calculation by a processor in the customer device 207. Alternatively, the customer device 207 may transmit the detected radio signal strength back to the merchant device 222.

The merchant device 222 can measure the radio signal strength for customer devices that are emitting a detectable radio signal for customer devices that are located within a particular distance of the merchant device. Each customer device may broadcast a radio signal to search for other devices that can communicate with the customer device. For example, customer device 207 may broadcast a Bluetooth signal to search for discoverable devices in the area. If the merchant device 222 is within range of the customer device 207 then then a transceiver in the merchant device 222 can detect the signal. In detecting the signal, the merchant device 222 can measure the strength of the signal.

The merchant device 222 may use the signal strength to determine a distance from the merchant device 222 to a customer device. Typically, when a customer device is closer to the merchant device 222, the signal strength detected by the merchant device is higher. For example, the merchant device 222 may measure the signal strength of customer device 207 to be 2 dBm, the signal strength of customer device 212 to be 4 dBm and the signal strength of customer device 217 to be 3 dBm. The merchant device 222 may then be able to calculate a distance from the merchant device to the customer device based on a signal strength and distance function. The merchant device 222 may calculate that the customer device 207 is five meters away, the customer device 212 is one meter away, and the customer device 207 is four meters away. The calculated distance is a singular scalar value, not a position. The calculated distance is a function of the detected signal strength and is not a triangulation of different signals.

One problem is that the signal strength may be attenuated because of physical barriers or electromagnetic interference. Sometimes a customer may have a customer device in a pocket or in a purse. When a customer device broadcasts a radio signal, the strength of the radio signal may be blocked when the signal passes through a customer's body or a customer's bag. For example, customer device 207 may be five meters from merchant device 222. When the customer device 207 is in the pocket of customer 205, the signal strength measured by the merchant device 222 may be 3 dBm. When the customer 205 is holding the customer device 207, the signal strength measured by the merchant device may be 4 dBm. Consequently, using solely the signal strength can lead to unreliable distance determination.

Each customer device includes a plurality of motion sensors that can measure and record the spatial movement of the customer device. The motion sensors may include an accelerometer, gyroscope, or other device used to measure motion. The motion sensors may provide data related to the six degrees of freedom, i.e., three rotational axes and three translational axes. For example, when a customer 205 removes the customer device 207 from the customer's pocket, the motions sensors of customer device 207 will detect the motion associated with that movement. If customer 210 drops the customer device 212, then the motion sensors of the customer device 212 will detect that motion. Further, while customer device 217 is not in motion, its motion sensors will indicate that fact.

The customer device may provide the data from the plurality of motion sensors to the merchant device 222. When a customer device and the merchant device 222 are both running an application for the cardless payment system and the customer has chosen to conduct cardless financial transactions with the merchant 220, each device may recognize the other and may share information from the plurality of motion sensors. For example, customer 215 may have enrolled in the cardless payment system and installed the cardless payment application on customer device 217 and selected to do business with merchant 220. When customer device 217 is within range of merchant device 222, the customer device 217 may provide the data from the plurality of motion sensors to the merchant device 222. The customer device 217 may provide the data from the plurality of motion sensors at a regular rate, for example, every second. Alternatively, the customer device 217 may provide data from the plurality of motion sensors when the customer device 217 detects a significant change in one of the data points from the plurality of motion sensors.

The merchant device 222 can validate the distance calculated on the basis of the radio signal strength using the data from the motion sensors. Once the merchant 222 determines the distance between the merchant device 222 and a customer device and receives the motion sensor data, the merchant device 222 may use the motion sensor data to confirm the accuracy of the calculated distance.

In one example, the customer 205 may not be moving relative to merchant device 222. Based on the signal strength emitted from customer device 207 and measured by merchant device 222, the merchant device 222 calculates that customer device 207 is an initial distance, e.g., five meters, from merchant device 222. While the customer 205 is stationary and not moving the customer device 207, a person or an object moves between the customer device 207 and the merchant device 222. Consequently, the signal strength of customer device 207 measured by merchant device 222 when the person or object is between the customer device 207 and the merchant device 222 is less than before the person or object moved between the customer device 207 and the merchant device 222. With the reduced signal strength, the merchant device 222 calculates the customer device 207 to be a second, larger distance, e.g., seven meters, from the merchant device. The merchant device 222 receives motion sensor data from the customer device 207. The merchant device 222 uses the motion sensor data to determine that the customer device 207 has moved less than a threshold amount in the time that the calculated distance to the merchant device 222 increased. The threshold amount could be a predetermined amount, e.g., one foot, or the threshold amount could be a percentage of the change in distance. Accordingly, the merchant device 222 rejects the new distance value and validates the initial distance.

In another example, the customer 205 may not be moving relative to the merchant device 222. The customer 205 may be facing the merchant device 222 and holding the customer device 207 such that the customer device 207 has a clear line of sight to the merchant device 222. The merchant device 222 may calculate that the customer device 207 is an initial distance, e.g., five meters, from the merchant device 222 based on the measured signal strength. The customer 205 may rotate around such that the customer's body is between the merchant device 222 and the customer device 207. At this point, the merchant device 222 may detect a lower signal strength and calculate that the distance between the merchant device 222 and the customer device 207 is a second, larger distance, e.g., seven meters. The merchant device 222 receives motion sensor data from the customer device 207. The merchant device 222 uses the motion sensor data to determine that the customer device 207 has rotated in the time that the calculated distance to the merchant device 222 increased. Accordingly, the merchant device 222 rejects the second, larger distance value and validates the initial value.

In another example, the customer 205 may be moving farther away from the merchant device 222. As the customer 205 is moving, the signal strength measured by the merchant device 222 decreases. The merchant device determines that the customer device 207 has moved from an initial distance, e.g., five meters, from the merchant device 222 to a second, larger distance, e.g., seven meters, from the merchant device 222 based on the signal strength. The merchant device 222 receives motion sensor data from the customer device 207. The merchant device 222 uses the motion sensor data to determine that the customer device 207 has moved laterally in the time that the calculated distance to the merchant device 222 increased. Accordingly, the merchant device 222 validates the second distance value.

In another example, the customer 205 may not be moving and may be an actual distance, e.g., five meters, away from the merchant device 222. The customer 205 may have the customer device 207 in the customer's back pocket. The merchant device 222 may calculate that the customer device 207 is an initial, calculated distance, e.g., seven meters, from the merchant device 222 based on the measured signal strength. The customer 205 may remove the customer device 207 from the customer's back pocket. At this point, the merchant device 222 may detect a higher signal strength and calculate that the distance between the merchant device 222 and the customer device 207 is a second, calculated distance, e.g., five meters. The merchant device 222 receives motion sensor data from the customer device 207. The merchant device 222 uses the motion sensor data to determine that the customer device 207 has moved vertically, e.g., thirty centimeters, in the time that the calculated distance to the merchant device 222 decreased. Accordingly, the merchant device 222 rejects the first calculated distance value and validates the second calculated distance value.

In another example, the customer 205 may not be moving and may be an actual distance, e.g., five meters, away from the merchant device 222. The customer 205 may have the customer device 207 in the customer's back pocket. The merchant device 222 may calculate that the customer device 207 is an initial, calculated distance, e.g., seven meters, from the merchant device 222 based on the measured signal strength. The customer 205 may remove the customer device 207 from the customer's back pocket. At this point, the merchant device 222 may detect a higher signal strength and calculate that the distance between the merchant device 222 and the customer device 207 is a second, calculated distance, e.g., five meters. The merchant device 222 receives motion sensor data from the customer device 207. The merchant device 222 uses the motion sensor data to determine that the customer device 207 has moved in a pattern similar to an "out of pocket motion profile." The "out of pocket motion profile" is consistent with the movement that the customer device 207 would travel when removed from a back pocket. The translational portion of the movement would be consistent with the path that a human hand, as limited by the shoulder and elbow, would take through space when removing an object from the person's back pocket. The rotational portion of the movement would be consistent with the rotation that a human hand would take when removing an object from the person's back pocket to in front of the person's face. Based on determining that the customer device 207 has moved in a similar pattern to the "out of pocket motion profile," the merchant device 222 rejects the first calculated distance value and validates the second calculated distance value. In some implementations, the customer device 207 may determine locally on the customer device 207, that the customer device 207 is moving in a similar pattern to the "out of pocket motion profile" and transmit that information to the merchant device 222.

In another example, the merchant device 222 may compare motion data and signal strength data to reject improbable accelerations or speeds. For example, the merchant device 222 may measure the signal strength emanating from the customer device 207 and calculate the acceleration of the customer device 207 to be a measured acceleration rate, e.g., five meters per second squared. The merchant device 222 may receive motion data from the customer device 207 and calculate the acceleration of the customer device 207 to also be the measured acceleration rate, e.g., five meters per second squared. In this instance, because the measured acceleration rate that is based on the signal strength and the measured signal strength that is based on the motion data are within a threshold, the merchant device 222 uses the motion data to verify the measured acceleration rate that is based on the signal strength. In another example, the merchant device may measure the signal strength emanating from the customer device and calculate the speed of the customer device to be a measured speed, e.g., twenty meters per second. The merchant device 222 may receive motion data from the customer device 207 and calculate the speed to be a different measured speed, e.g., 0.1 meters per second. In this instance, because the measured speed that is based on the signal strength and the measured speed that is based on the motion data are separated by at least a threshold, the merchant device uses motion data to reject the measured speed that is based on the signal strength.

The merchant device 222 can generate a list of customers based on the distances from the merchant device. The merchant device 222 can identify the customer devices in the merchant's store who have enrolled in the cardless payment system and using the computed distances can generate a ranked list based on the validated distances to the merchant device 222.

In the example described above, the merchant device validated the distances using the motion sensor data. In some implementations, the customer device may compute the distance and validate or adjust the distance based on the data from the motion sensors. For example, instead of transmitting the motion sensor data to the merchant device 222, the customer device 205 may validate the distance locally on a processor in the customer device 205. The merchant device 222 computes the approximate distance to the customer device 205, transmits the approximate distance to the customer device 205, the customer device 205 validates or adjusts the approximate distance, and provides the validated or adjusted distance back to the merchant device 222. In some implementations, the merchant device 222 may emit a signal that the customer device 207 may use to compute distance based on the strength of the signal emitted from the merchant device 222.

In some implementations, the customer device may provide motion sensor data encoded in the radio signal that the merchant device 222 uses to compute the approximate distance to the customer device. For example, the merchant device 222 may confirm that the merchant device 222 is receiving the radio signal from the customer device 205. Instead of transmitting the motion sensor data separately from the Bluetooth signal that the merchant device 222 uses to compute approximate distance, the customer device 205 may encode the motion sensor data in the Bluetooth signal.

Figure 3:
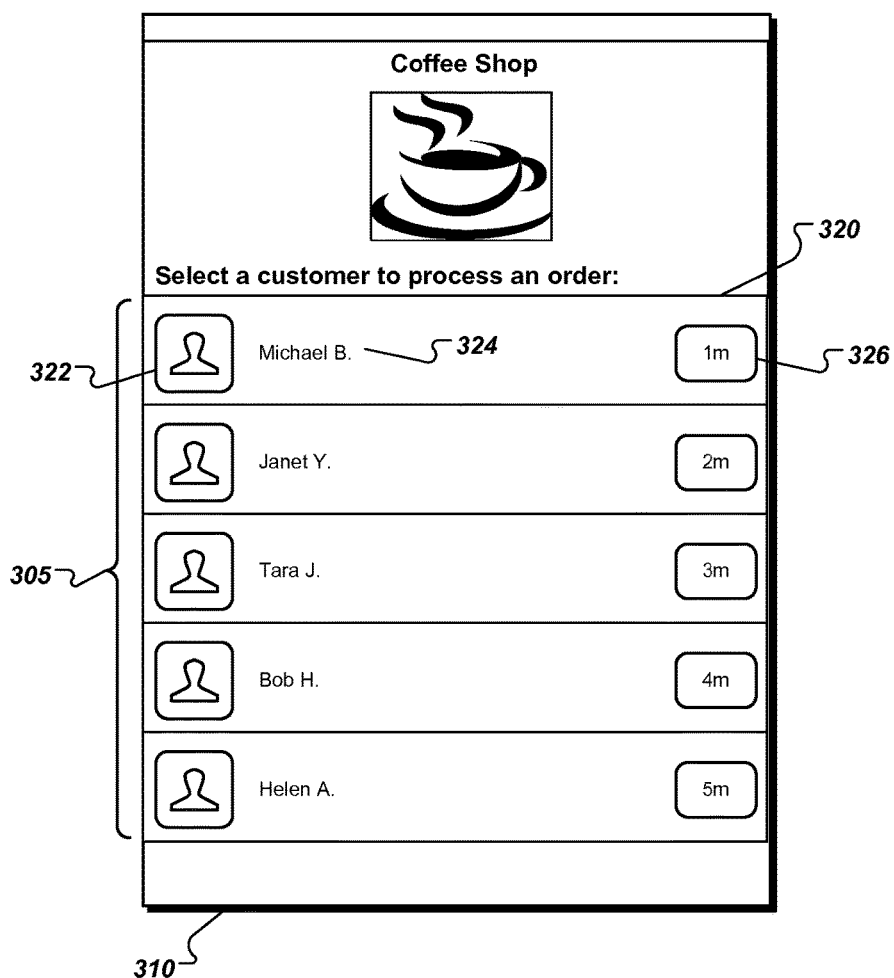
FIG. 3 is diagram of an example view of a user interface of an application installed on a merchant device.

FIG. 3 is diagram of an example view of a user interface of an application installed on a merchant device. The user interface 300 includes a presentation of a ranking 305 of customers according to a distance between a customer device of each customer and the merchant device. The distance can be computed based on a signal strength measured by the merchant device for each user device and validated or adjusted based on motion sensor data.

The presentation includes a representation 320 for each customer, e.g. customer who is present in the merchant's store, has enrolled in the cardless payment system, and has selected to conduct financial transactions with the merchant. The representation 320 may include a customer's profile picture 322, a customer's name 324, and an indication of a distance 326 of the user device from the merchant device.

A user operating the merchant device can use the user interface 310 to process orders placed by customers, e.g. by selecting each customer from the ranking 305. The user operating the merchant device can then enter items selected by the customer and then select an option that causes the merchant device to process the transaction, for example, as a cardless payment transaction that accesses the customer's account.

After conducting the payment transaction for a particular user, the merchant device can remove the customer's mobile device from consideration for future ranking by distance. In other words, the merchant device can flag an identifier of the customer device to indicate that the customer's payment transaction is finished and the customer device should not be ranked with other customer devices, even if currently located very near the merchant device. The merchant device can then automatically update the displayed listing of remaining customers. The merchant device may also recompute and validate distances between each customer device and the merchant device, e.g. by receiving new signal strength measurements and motion sensor data.

Figure 4:
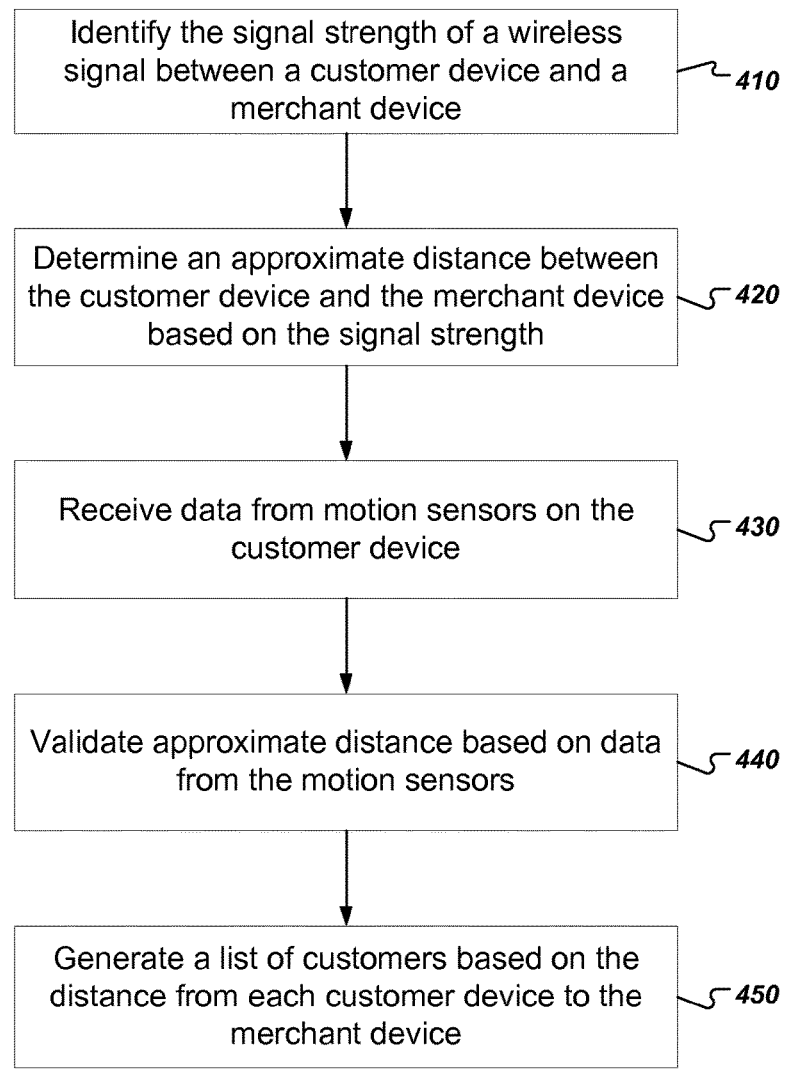
FIGS. 4 and 5 are flow charts of an example processes for computing and validating distances between devices.

FIG. 4 is a flow chart of an example process 400 for computing and validating distances between devices. In general, the process 400 computes distances between a customer device and a merchant device. The process 400 will be described as being performed by a computer system comprising one or more computers, for example, the merchant device 104 as shown in FIG. 1 or the merchant device 222 as shown in FIG. 2.

The merchant device identifies the signal strength of a wireless signal between a customer device and a merchant device (410). The customer device may broadcast a wireless signal to search for other devices with which to communicate. The merchant device may receive this signal and measure a strength of the signal. The customer device may also broadcast an identifier for the customer device by encoding the customer identifier in the signal. For example, the customer may have a unique customer identifier for the cardless payment system. When the cardless payment application is running on the customer device, the customer device may encode the customer identifier in the broadcast signal. The merchant device can identify the customers based on the customer identifier. The wireless signal may be a Bluetooth signal, a Wi-Fi signal, or a similar type of wireless signal.

The merchant device determines an approximate distance between the customer device and the merchant device based on the signal strength (420). Typically, the lower the signal strength the farther away the customer device is from the merchant device. For example, if the signal strength for a first customer device is 3 dBm and the signal strength for a second customer device is 1 dBm, then the first customer device may be closer to the merchant device than the second customer device.

The merchant device receives data from motion sensors on the customer device (430). The motion sensors may detect movement along the six degrees of freedom. The customer device may continuously provide the motion sensor data to the merchant device, for example, every second. Alternatively, the customer device may provide motion sensor data when one of the points of data changes more than a threshold. The motion sensor data may be provided over Wi-Fi or may be encoded in the signal used by the merchant device to measure signal strength.

The merchant device validates the approximate distance based on data from the motion sensors (440). The merchant device may use the data from the motion sensors to determine the movement of the customer device. As described in the examples above, the merchant device may determine whether the customer device has moved, rotated, moved laterally with respect to the merchant device, or moved vertically. The merchant device, based on determining the movement of the customer device, may validate the approximate distance or reject the approximate distance and validate the previous distance.

The merchant device generates a list of customers based on the distance from each customer device to the merchant device (450). The merchant device computes and validates the distances of each customer device that has signed up for the cardless payment system, has selected to transact business with the merchant, and is near the merchant device. The merchant device displays a list of the customers associated with each customer device and displays them on the merchant device.

Figure 5:
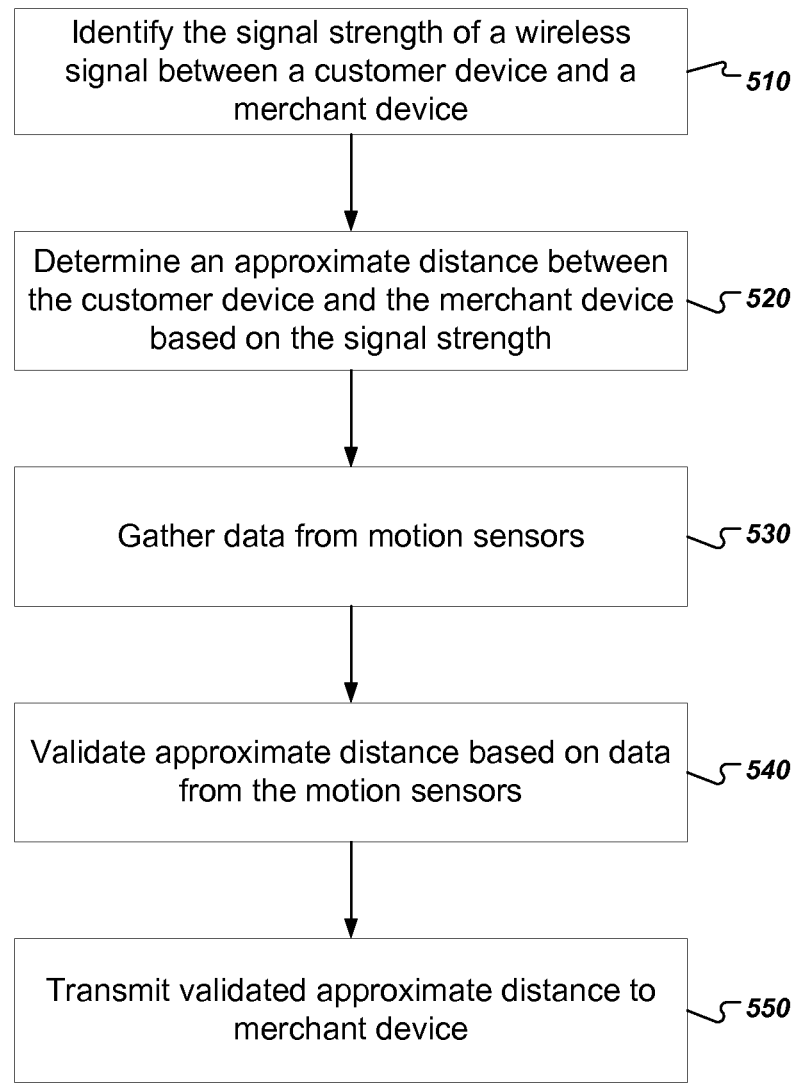

FIG. 5 is a flow chart of an example process 500 for computing and validating distances between devices. In general, the process 500 computes distances between a customer device and a merchant device. The process 500 will be described as being performed by a computer system comprising one or more computers, for example, the user device 102 as shown in FIG. 1 or the customer device 207 as shown in FIG. 2.

The customer device identifies the signal strength of a wireless signal between a customer device and a merchant device (510). The merchant device may broadcast a wireless signal, e.g., to search for other devices with which to communicate. The customer device may receive this signal and measure a strength of the signal. The merchant device may also broadcast an identifier for the merchant device by encoding a merchant identifier in the signal. For example, the merchant may have a unique merchant identifier for the cardless payment system. The merchant device may encode the customer identifier in the broadcast signal. The customer device can identify the merchant based on the merchant identifier. The wireless signal may be a Bluetooth signal, a Wi-Fi signal, or a similar type of wireless signal.

The customer device determines an approximate distance between the customer device and the merchant device based on the signal strength (520). Typically, the lower the signal strength the farther away the customer device is from the merchant device. For example, if the signal strength detected by a first customer device is 3 dBm and the signal strength detected by a second customer device is 1 dBm, then the first customer device may be closer to the merchant device than the second customer device.

The customer device gathers data from motion sensors (530). The motion sensors may be located locally on the customer device. The motion sensors may detect movement along the six degrees of freedom that consist of the three translational directions and the three rotational axes.

The customer device validates the approximate distance based on data from the motion sensors (540). The customer device may use the data from the motion sensors to determine the movement of the customer device. As similarly described in the examples above, the customer device may determine whether the customer device has moved, rotated, moved laterally with respect to the merchant device, or moved vertically. The customer device, based on determining the movement of the customer device, may validate the approximate distance or reject the approximate distance and validate the previous distance.

The customer device transmits the validated approximate distance to the merchant device (550). The merchant device may use the validated approximate distances received from several customer devices to generate a list of the customers associated with each customer device and display the list on the merchant device.

FIG. 6 is a diagram of an example graph 600 of signal strength and motion data. Graph 600 illustrates the measured signal strength and the computed movement of the customer device. Curve 610 represents the measured signal strength over time, and curve 620 represents the computed movement of the customer device over time. Between time T0 and time T1, the signal strength is constant at a first strength, e.g., A dBm, and the computed movement is zero. In this time period, the merchant device may calculate, based on the signal strength that the customer device is a first computed distance, e.g., three meters, from the merchant device. With the computed movement being zero, the merchant device may validate the first computed distance.

At time T2, the signal strength drops to a second strength, e.g., C dBm. At the same time T2, the signal strength remains constant and the computed motion is zero. At this time, the merchant device may calculate, based on the signal strength that the customer device is a second computed distance, e.g., five meters, from the merchant device. However, based on the motion data that indicated that the customer device did not move at or around time T2, then merchant device may reject the second computed distance and revalidate the first computed distance, e.g., three meters.

Between time T2 and T3, the signal strength rises to a third strength, e.g., B dBm and the computed motion rises to a particular speed, e.g., one meter per second. In this time period, the merchant device may calculate, based on the increase in the signal strength that the customer device is moving from the first computed distance to a third computed distance, e.g., three meters to four meters. Based on the motion data, the merchant device may determine that the customer device was moving between time T2 and T3, and may validate the third computed distance. In some implementations, the customer device may perform the above described calculations and comparisons locally on the customer device and transmit the validated distance to the merchant device.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on a non transitory computer storage medium for execution by, or to control the operation of, data processing apparatus. Alternatively or in addition, the program instructions can be encoded on an artificially generated propagated signal, e.g., a machine generated electrical, optical, or electromagnetic signal, that is generated to encode information for transmission to suitable receiver apparatus for execution by a data processing apparatus. A computer storage medium can be, or be included in, a computer readable storage device, a computer readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components.

The computing system can include clients and servers. A client and server are generally remote from each other and typically interact through a communication network. The relationship of client and server arises by virtue of computer programs running on the respective computers and having a client server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A system to determine relative proximity between a customer mobile device and a point-of-sale (POS) system comprising:
the customer mobile device including:
one or more mobile device transceivers that exchange first data with the POS system; and
a plurality of motion sensors that detect horizontal movement, vertical movement, and rotational movement of the customer mobile device; and
the POS system comprising:
a display; and
a POS computer including:
at least one POS transceiver that exchanges second data with the one or more mobile device transceivers over a wireless signal and determines a strength of the wireless signal; and
a POS processor configured to:
receive third data identifying goods or services associated with a financial transaction between a customer operating the customer mobile device and a merchant operating the POS system;
determine an approximate distance between the POS computer and the customer mobile device based on the strength of the wireless signal associated with the second data exchanged between the at least one POS transceiver and the one or more mobile device transceivers;
based on signals from the plurality of motion sensors, determine at least one of the horizontal movement, the vertical movement, or the rotational movement of the customer mobile device;
determine that at least one of the horizontal movement, the vertical movement, or the rotational movement of the customer mobile device does not indicate that the approximate distance between the POS computer and the customer mobile device is inaccurate;

validate the distance between the POS computer and the customer mobile device based on determining that at least one of the horizontal movement, the vertical movement, or the rotational movement of the customer mobile device does not indicate that the approximate distance between the POS computer and the customer mobile device is inaccurate;

access one or more validated distances respectively corresponding to one or more other customers;

rank the customer and the one or more other customers based at least in part on the approximate distance and the one or more validated distances to generate a ranked list of customers;

present, on the display, the ranked list of customers;

receive a selection of the customer; and request processing of the financial transaction between the customer and the merchant based on receiving the selection of the customer.

2. The system of claim 1, wherein the wireless signal is a Bluetooth signal or Wi-Fi signal.

3. The system of claim 1, wherein the POS processor is further configured to:
receive a customer identifier for each of the customer and the one or more other customers,
wherein presenting the ranked list of customers is based at least in part on presenting the ranked list of customers with respective customer identifiers.

4. The system of claim 1, wherein a first mobile device transceiver of the one or more mobile device transceivers transmits a first portion of the first data associated with the wireless signal and a second mobile device transceiver of the one or more mobile device transceivers transmits a second portion of the first data that corresponds to the signals from the plurality of motion sensors.

5. The system of claim 1, wherein a same mobile device transceiver of the one or more mobile device transceivers transmits a first portion of the first data associated with the wireless signal and a second portion of the first data that corresponds to the signals from the plurality of motion sensors.

6. The system of claim 1, wherein the customer mobile device further includes an application operable to:
receive input from the customer, the input including identification information and financial information; and
send fourth data to the POS system, the fourth data including the identification information and the financial information.

7. The system of claim 6, wherein the POS processor is further configured to:
receive the fourth data;
generate an account for the customer based at least in part on the fourth data; and
associate an indication with the account indicating that transactions associated with the identification information can be completed via cardless transaction processing.

8. The system of claim 7, wherein the third data further includes at least a portion of the identification information associated with the customer, and the POS processor is further configured to:

access, based at least in part on the portion of the identification information, the account for the customer;

determine, based at least in part on the indication associated with the account, that the financial transaction is eligible for completion via the cardless transaction processing;

send, to the customer mobile device and responsive to the selection of the customer, a request for consent to process the financial transaction via the cardless transaction processing;

receive, from the customer mobile device and responsive to the request for consent, a confirmation to process the financial transaction via the cardless transaction processing; and process the financial transaction based at least in part on the financial information associated with the account instead of requiring a presence of a payment instrument.

9. A system to determine relative proximity comprising:
at least one computing device transceiver, associated with a computing device, that exchanges first data with at least one mobile device transceiver over a wireless signal, the mobile device transceiver associated with a mobile device; and
a processor, associated with the computing device, operable to:
determine an approximate distance between the computing device and the mobile device based on a strength of the wireless signal associated with the first data exchanged between the at least one computing device transceiver and the at least one mobile device transceiver;
receive, at the at least one computing device transceiver, second data determined by one or more motion sensors associated with the mobile device, the second data including at least one of translational movement associated with the mobile device or rotational movement associated with the mobile device;
determine a movement of the mobile device based on the second data;
determine that the movement of the mobile device does not indicate that the approximate distance between the computing device and the mobile device is inaccurate;
validate the approximate distance between the computing device and the mobile device based on determining that the movement of the mobile device does not indicate that the approximate distance between the computing device and the mobile device is inaccurate;
rank, based at least in part on validating the approximate distance between the computing device and the mobile device, a customer associated with the mobile device and one or more other customers based at least in part on the approximate distance to generate a ranked list of customers;
generate a list based at least in part on the ranked list of customers; and
present the list via a display of the computing device.

10. The system of claim 9, wherein the wireless signal is a Bluetooth signal or Wi-Fi signal.

11. The system of claim 9, wherein the processor is further configured to:
receive a customer identifier for the customer and the one or more other customers, wherein generating the ranked list of customers is based at least in part on generating the ranked list of customers with respective customer identifiers.

12. The system of claim 9, wherein the customer and the one or more other customers have previously provided information for processing future transactions as cardless transactions.

13. The system of claim 9, wherein the first data and the second data are associated with a same data transmission.

14. The system of claim 9, wherein the first data and the second data are associated with different data transmissions.

15. A computer-implemented method, comprising:
- determining, by one or more processors, first data that is associated with transmitting and receiving one or more wireless signals between a first device and a second device;
- determining an approximate distance between the first device and the second device based on a strength of the one or more wireless signals;
- receiving, from the first device, second data associated with one or more motion sensors on the first device, the second data including at least one of translational movement associated with the first device or rotational movement associated with the first device;
- determining a movement of the first device based on the second data;
- determining that the movement of the first device does not indicate that the approximate distance between the first device and the second device is inaccurate;
- validating the approximate distance between the first device and the second device based on determining that the movement of the first device does not indicate that the approximate distance between the first device and the second device is inaccurate;
- determining a relative proximity between the first device and the second device based at least in part on the approximate distance between the first device and the second device; and
- presenting, via a display of the second device and based at least in part on the relative proximity, an indication associated with the first device.

16. The computer-implemented method of claim 15, wherein the one or more wireless signals are Bluetooth signals or Wi-Fi signals.

17. The computer-implemented method of claim 15, comprising:
- receiving a customer identifier associated with the first device, the first device operated by a customer, the customer identifier corresponding to the customer; generating, based at least in part on the relative proximity, a list with the customer identifier ranked among other customer identifiers based on the relative proximity; and
- presenting the list via the display, the list including the indication associated with the first device in a position corresponding to the customer identifier.

18. The computer-implemented method of claim 17, further comprising receiving a selection, from the list presented via the display, of the customer identifier.

19. The computer-implemented method of claim 18, further comprising:
- receiving identification information and financial information from the second device, the identification information and the financial information being associated with the customer;
- generating an account for the customer based at least in part on the identification information and the financial information; and
- associating an indication with the account indicating that transactions associated with the identification information can be completed via cardless transaction processing.

20. The computer-implemented method of claim 19, further comprising:
- receiving transaction data associated with a financial transaction between the customer and a merchant associated with the first device, the transaction data identifying an item to be acquired by the customer and at least a portion of the identification information;
- access, based at least in part on the portion of the identification information, the account for the customer;
- determine, based at least in part on the indication associated with the account, that the financial transaction is eligible for completion via the cardless transaction processing;
- send, to the second device and responsive to the selection of the customer, a request for consent to process the financial transaction via the cardless transaction processing;
- receive, from the second device and responsive to the request for consent, a confirmation to process the financial transaction via the cardless transaction processing; and
- process the financial transaction based at least in part on the financial information associated with the account instead of requiring a presence of a payment instrument.

* * * * *